US006209490B1

(12) United States Patent
Schwede

(10) Patent No.: US 6,209,490 B1
(45) Date of Patent: Apr. 3, 2001

(54) LIVING QUARTERS CONTAINER FOR CATS OR FERRETS

(76) Inventor: Gary J. Schwede, 9103 Salem, Lubbock, TX (US) 79424

( * ) Notice: Subject to any disclaimer, the term of this patent is extended or adjusted under 35 U.S.C. 154(b) by 0 days.

(21) Appl. No.: 09/335,807

(22) Filed: Jun. 17, 1999

(51) Int. Cl.[7] .......... A01K 1/03
(52) U.S. Cl. .......... 119/472; 119/479
(58) Field of Search .......... 119/475, 417, 119/421, 702, 706, 479, 485, 472, 165, 166, 484; 446/171

(56) References Cited

U.S. PATENT DOCUMENTS

| | | | | |
|---|---|---|---|---|
| D. 349,783 | | 8/1994 | Berger . | |
| D. 370,093 | | 5/1996 | DeLuca . | |
| 2,821,165 | | 1/1958 | Wright . | |
| 3,561,757 | | 2/1971 | Schillig . | |
| 4,301,766 | | 11/1981 | Piccone . | |
| 4,347,807 | | 9/1982 | Reich . | |
| 4,359,837 | * | 11/1982 | Hool | 446/171 |
| 4,497,279 | | 2/1985 | Bell . | |
| 4,803,952 | | 2/1989 | Houser . | |
| 4,844,016 | | 7/1989 | Filosa . | |
| 5,050,536 | | 9/1991 | Baker . | |
| 5,078,094 | * | 1/1992 | Hoover . | |
| 5,080,042 | | 1/1992 | Rubin . | |
| 5,092,277 | * | 3/1992 | Baillie et al. | 119/165 |
| 5,134,969 | * | 8/1992 | Mason et al. | 119/472 |
| 5,247,901 | * | 9/1993 | Landon et al. | 119/419 |
| 5,320,065 | | 6/1994 | Leopold . | |
| 5,438,040 | * | 8/1995 | Ekwuribe | 514/3 |
| 5,975,017 | * | 11/1999 | Cameron | 119/165 |

* cited by examiner

*Primary Examiner*—Peter M. Poon
*Assistant Examiner*—Yvonne Abbott

(57) ABSTRACT

A preferred embodiment has a generally rectangular solid shaped housing to allow side-by-side and stacked arrangements of a plurality of housings and provide for good floor space utilization, with connected interior compartments for feeding and watering, exercise, rest, and waste disposal. A separate, closed interior compartment provides for storage of occupant specific articles. A plurality of doors on the housing front elevation provide openings for pet entry and egress, cleaning, food and water replenishment, and storage access.

11 Claims, 2 Drawing Sheets

LIVING QUARTERS CONTAINER FOR CATS OR FERRETS

TECHNICAL FIELD

The present invention relates to the field of pet containers and most particularly, to such containers in a multi-compartment form specifically adapted to cats and ferrets.

BACKGROUND OF THE INVENTIONS

For any number of reasons, it is often convenient to confine cats or ferrets to cages. This is particularly true for veterinary clinics and animal boarding facilities. These commercial facilities must provide care for a number of such pets at any given time and, for the most part, use permanently installed cages. Adequate cage accommodations may not always be available and, in order to expand capacity when the need arises, it is not uncommon to use pet carriers. These pet carriers are the commonly seen "over-sized shoe boxes", with a wire door at one end and a handle on top. There are also a variety of pet containers that have been offered as playhouses. One of these is Reginald Baker's U.S. Pat. No. 5,050,536, with multiple levels and a plurality of entrance/egress apertures. Others, such as Michael Berger's U.S. Pat. No. Des. 349,783, provide a scratching post, a shelf-like perch and a glass front. Berl Rubin's U.S. Pat. No. 5,080,042 discloses a stackable play unit for animals, providing changable configurations to maintain the animal's interest.

Veterinary clinics and boarding facilities use the aforementioned pet carriers to utilize floor space efficiently and provide extra capacity because they are stackable and inexpensive. Since these carriers are intended primarily for in-transit situations, they provide only a minimum of living space and no separate relief facilities. Therefore, veterinary clinics and boarding operations use pet carriers for longer stays at the expense of some extra effort in caring for and exercising the animals.

Individual units can also be used to confine cats and ferrets in apartments and home when owners have a long weekend or extended workday. This is especially useful for pets that "break litter training" (soil the house) or tend to be destructive if left alone. This invention allows much greater freedom and less stress than a conventional four-sided pet carrier.

There is an abiding need for portable, stackable pet containers which are better adapted to confining animals such as cats and ferrets, while facilitating their care and allowing some amount of exercise. When caring for a number of pets a system for keeping track of private possessions, such as leashes, collars and toys is needed. Since an error may have grim consequences, another concern is being certain that any required medications are given to each pet. This is especially difficult to administer when there are a large number of animals, the turnover rate is high, and clients with special needs.

Caging unfamiliar animals and keeping them inside when the cage door is opened for feeding or any other reason is another aspect of caring for a large number of animals. If the cage door is small, it may be difficult to cage a reluctant animal. If the cage door is made large, the animal may slip out too easily.

Therefore, the first object of the present inventions is to provide a compact, stackable pet container in a form that is adapted to efficient use of floor space. A second object of the present invention is to provide this pet container in a form that facilitates caring for the animals. Yet a third object is that this pet container provide pleasant living quarters for the animal.

SUMMARY OF THE INVENTIONS

The present inventions contemplate improved apparatus to be used in caring for cats, ferrets and similar animals, most particularly in a commercial setting such as a veterinary clinic, boarding operation, and individual units in homes and apartments. Practice of the present inventions uses some steps and apparatus well known in the pet container arts and therefore, not the subject of detailed discussion herein.

In a preferred embodiment of the present inventions, a rectangular solid shaped exterior housing, with provisions for ventilation of its interior, allows stacking and good floor space utilization. The housing has connected interior compartments with facilities for feeding and watering, exercise, rest, and waste disposal. A separate, closed interior compartment is provided for storage of special diet items, playthings, medications or other occupant specific articles. A plurality of doors on the housing front elevation provide openings for pet entry and egress. These doors also allow for cleaning, food and water replenishment, and storage access.

BRIEF DESCRIPTION OF THE DRAWINGS

The accompanying drawings are incorporated into and form a part of the specification to assist in explaining the present inventions. The drawings illustrate preferred and alternative examples of how the inventions can be made and used, and are not to be construed as limiting the inventions to only those examples illustrated and described. The various advantages and features of the present inventions will be apparent from a consideration of the drawings in which.

DETAILED DESCRIPTION OF THE DRAWINGS

Figure 1:
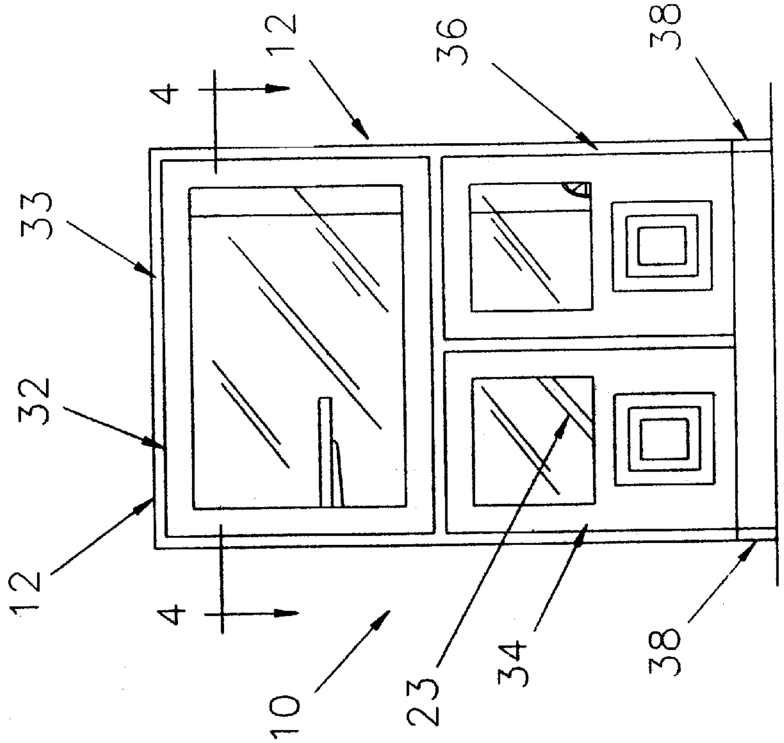
FIG. 1 shows a front elevation view of a preferred embodiment of the present inventions.
Figure 2:
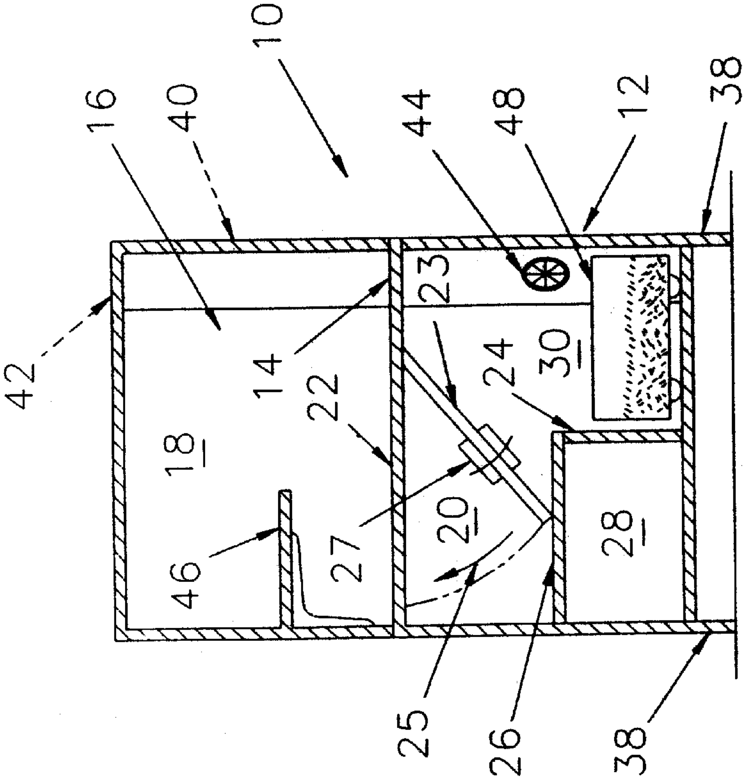
FIG. 2 shows a vertical cross-section view of the preferred embodiment as seen along a plane parallel to the front elevation of FIG. 1.

The present inventions are described in the following by referring to drawings of examples of how the inventions can be made and used. In these drawings, reference characters are used throughout the views to indicate like or corresponding parts. FIG. 1 illustrates one embodiment of living quarters container 10 and FIG. 2 shows a cross-section view thereof. The embodiments shown and described herein are exemplary. Many details are well known in the art, and as such are neither shown nor described. It is not claimed that all of the details, parts, elements, or steps described and shown were invented herein. Even though numerous characteristics and advantages of the present inventions have been described in the drawings and accompanying text, the description is illustrative only, and changes may be made in the detail, especially in matters of shape, size, and arrangement of the parts within the principles of the inventions to the full extent indicated by the broad general meaning of the terms used in the attached claims.

FIG. 1 is a frontal view of the living container 10 of the present inventions and FIG. 2 is a cross-sectional view of living container 10 as seen along a cutting plane parallel to frontal surface 33 of FIG. 1. Housing 12 is made in the general shape of a rectangular solid, so that a number of containers 10 may be placed in a side-by-side arrangement, and additional units may be stacked vertically atop the side-by-side row. This side-by-side arrangement of a plurality of said housings may be placed against a wall or partition, or backed against a similar side-by-side arrangement.

A substantially horizontal partition 14 divides interior 16 of housing 12 into an upper compartment 18 and a lower compartment 20. Horizontal partition 14 includes aperture 22 sized as a passageway for small animals between upper compartment 18 and lower compartment 20. Partial vertical partition 24 divides lower compartment into storage compartment 28 and waste disposal section 30. Partial horizontal partition 26 cooperates with partial vertical partition 24 to enclose storage compartment 28, while allowing animal passage between waste disposal section 30 and upper compartment 18 via passageway aperture 22. Ramp 23 is included abutting passageway aperture 22, where it will serves to encourage vertical animal movement within the confines of interior 16 when in the lowered position shown in FIG. 2. The occupant may be confined to upper compartment 18 by placing ramp 23 in the raised position indicated by arrow 25 where it is held by engagement of rotatable latch 27 with horizontal partition 14. In this raised position, ramp 23 closes or blocks access aperture 22. In the preferred embodiment the access aperture and ramp are approximately the same size and the ramp acts as a hinged door.

Relatively large Plexiglass paneled door 32, hinge to open on the frontal surface 33 of housing 12, provides access to upper compartment 18 for small animal entry and egress. The size of door 32 is intended to be large enough that a reluctant animal cannot brace against the sides of the door opening to resist being pushed into interior 16. Separate Plexiglass paneled door 34, similarly mounted on frontal surface 33, provides access for replenishment of food and water and also, access to enclosed storage compartment 28. Storage compartment 28 is accessible only by opening door 34, and thus provides a convenient, secure repository for occupant specific items such as special client's medications, leash, collar, grooming combs and brushes, toys, etc. In the same manner as door 34, similarly mounted, separate door 36 provides access for cleaning waste disposal section 30 and for adding absorbent material to litter box 48 as needed. Having smaller, separate doors 34 and 36, that do not open into the main living area of upper compartment 18, makes it easier to take care of feeding, watering and servicing litter box 48, without concern over letting the animal slip out.

Shelf 46 serves as an animal resting place that introduces some added variety into interior 16 and appeals to the animal's natural instinct to perch and nap in an secure, elevated area. Partial horizontal partition 26, aside from acting to enclose storage compartment 28, also serves as a feeding and watering table. This area is elevated above waste disposal section 30, from which it is sufficiently separated that the animals fastidious nature is not offended when eating. In addition, food or water spillage tends to fall into litter box 48, so as to reduce housekeeping needs.

Figure 3:
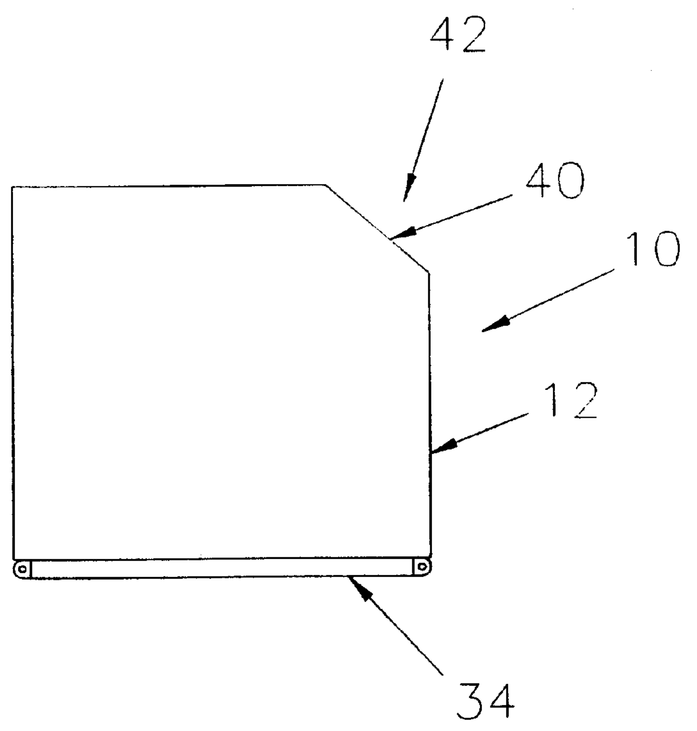
FIG. 3 is a plan view of the preferred embodiment.

As shown in FIGS. 1 and 2, spacers 38 raise the bottom of housing 12 in order to allow circulation of air underneath and around and to into interior 16 of housing 12. As shown in FIG. 3, housing 12 is given a beveled rear surface 40 to further facilitate such air circulation by providing vertical airway 42. Vertical airway 42 communicates with interior 16 through at least one vent 44 in beveled rear surface 40 to provide means for air circulation in any side-by-side arrangement, even if placed against a wall or partition, or backed against a similar side-by-side arrangement.

Figure 4:
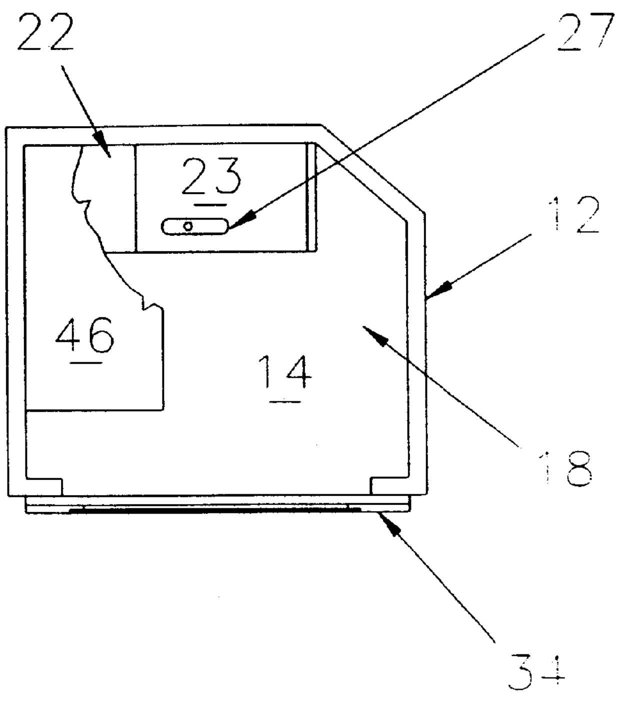
FIG. 4 is a horizontal cross-section view as seen along cutting plane 4—4 of FIG. 1.

FIG. 4 is a cross-section plan view taken through upper compartment 18 so as to show the relative locations of ramp 23 and shelf 46. Rotatable latch 27 is shown in the disengaged position.

The embodiments shown and described above are exemplary. Many details are often found in the art and, therefore, many such details are neither shown nor described. It is not claimed that all of the details, parts, elements, or steps described and shown were invented herein. Even though numerous characteristics and advantages of the present inventions have been described in the drawings and accompanying text, the description is illustrative only, and changes may be made in the detail, especially in matters of shape, size, and arrangement of the parts within the principles of the inventions to the full extent indicated by the broad meaning of the terms of the attached claims.

The restrictive description and drawings of the specific examples above do not point out what an infringement of this patent would be, but are to provide at least one explanation of how to use and make the inventions. The limits of the inventions and the bounds of the patent protection are measured by and defined in the following claims.

I claim:

1. A container for small animal occupancy comprising:

a housing having rectangular front and side elevations so as to present a generally rectangular solid exterior shape that allows placement adjacent walls, straight-sided objects, and side-by-side and stacked arrangements of a plurality of said housings;

at least one substantially horizontal partition dividing the interior of said housing into first and second compartments, said at least one horizontal partition including an aperture sized as a passageway for small animals between said compartments;

a partial vertical partition dividing said first section into a storage section and a waste disposal section;

a partial horizontal partition cooperating with said partial vertical partition to enclose said storage section, so as to make it inaccessible from said interior, while allowing communication between said waste disposal section and said second compartment via said passageway aperture; and at least one door opening on said front elevation, for small animal entry/egress and for cleaning, food and water replenishment, and storage compartment access.

2. A container for small animal occupancy according to claim 1 wherein said housing further comprises:

a generally rectangular plan view, except for at least one angled rear corner, made so as to create a vertical airway for ventilation of the interior of said housing in any side-by-side arrangement of a plurality thereof;

a substantially horizontal supporting surface; and vertical spacing means between said housing and said horizontal supporting surface for allowing circulation of air to said vertical airway in any side-by-side arrangement of a plurality of said housings.

3. A container for small animal occupancy according to claim 1 wherein said interior further comprises:

a hinged ramp (ramp may be hinged or slide shut) that may be closed to confine animal in upper compartment while feeding or cleaning cage;

a ramp abutting said passageway aperture and leading from said first to said second compartment; and an animal resting shelf in said first compartment.

4. A container for small animal occupancy according to claim 1 wherein said at least one door opening further comprises:

a first door opening into said second compartment for small animal entry and egress;

a separate second door opening into said first compartment for cleaning and replenishment of said waste disposal section; and a separate third door opening into said storage compartment for access thereto.

5. A container for small animal occupancy according to claim 4 wherein said first door opening is relatively large as compared to said second and third door openings.

6. A container for small animal occupancy comprising:

a housing having rectangular front and side elevations so as to present a generally rectangular solid exterior shape that allows side-by-side and stacked arrangements of a plurality of said housings, said housing further including vents to allow circulation of air throughout the interior thereof;

a substantially horizontal partition dividing said housing interior into upper and lower compartments, said at least one horizontal partition including an aperture sized as a passageway for small animals between said compartments;

a partial vertical partition dividing said lower compartment into a storage section and a waste disposal section;

a partial horizontal partition cooperating with said partial vertical partition to enclose said storage section as a separate compartment, while allowing communication between said waste disposal section and said upper compartment via said passageway aperture; and two or more doors opening on said front elevation, for small animal entry/egress and for cleaning, food and water replenishment, and storage access, said doors being at least partially non-opaque.

7. A container for small animal occupancy according to claim 6 wherein said housing further comprises:

a hinged ramp (ramp may be hinged or slide shut) that may be closed to confine animal in upper compartment while feeding or cleaning cage;

a generally rectangular plan view, except for at least one angled rear corner, made so as to create a vertical airway for ventilation of the interior of said housing in any side-by-side arrangement of a plurality thereof;

a substantially horizontal supporting surface; and vertical spacing means between said housing and said horizontal supporting surface for allowing circulation of air to said vertical airway in any side-by-side arrangement of a plurality of said housings.

8. A container for small animal occupancy according to claim 6 wherein said interior further comprises:

a ramp abutting said passageway aperture and leading from said first to said second compartment; and an animal resting shelf in said first compartment.

9. A container for small animal occupancy according to claim 6 wherein said at least one door opening further comprises:

a door opening into said second compartment for small animal entry and egress;

a separate second door opening into said first compartment for cleaning and replenishment of said waste disposal section; and a separate third door opening into said storage compartment for access thereto.

10. A container for small animal occupancy according to claim 6 wherein a hinge is provided on said ramp whereby said ramp may be moved into and out of a position to close said passageway aperture to confine the animal in the first compartment while feeding or cleaning the container.

11. A method for the care and feeding of a small animal kept in a container, wherein the container is divided into interconnected upper and lower sections and the lower section is sub-divided into an enclosed storage section and a waste disposal section, comprising the steps of:

providing separate access doors for each said section, the upper section door being relatively large;

placing the animal in the container, and removing it therefrom, through the relatively large upper section door;

storing medications, diet items, and items specific to the animal occupant in the enclosed storage section;

feeding and watering the animal and accessing animal specific items, as required, through the separate door provided for the storage section; and cleaning and servicing the waste disposal section through the separate door provided for that section.

* * * * *